United States Patent [19]
Renner

[11] 3,778,093
[45] Dec. 11, 1973

[54] BUMPER FOR MOTOR VEHICLES
[75] Inventor: Hermann Renner, Boblingen, Germany
[73] Assignee: Daimler-Benz Aktiengesellschaft, Stuttgart-Unterturkeim, Germany
[22] Filed: Sept. 17, 1971
[21] Appl. No.: 181,384

[30] Foreign Application Priority Data
Sept. 17, 1970 Germany.................. P 20 45 962.5

[52] U.S. Cl. ............................... 293/71 R, 293/98
[51] Int. Cl. ............................................. B60r 19/08
[58] Field of Search .................. 293/64, 65, 66, 67, 293/70, 71 R, 71 P, 98

[56] References Cited
UNITED STATES PATENTS
3,427,063  2/1969  Taylor................................. 293/73
3,583,530  6/1971  De Venne............................... 188/1
3,606,434  9/1971  Barton et al. ......................... 293/64

*Primary Examiner*—Gerald M. Forlenza
*Assistant Examiner*—Robert Saifer
*Attorney*—Craig, Antonelli & Hill

[57] ABSTRACT

A bumper or the like for motor vehicles, especially for passenger motor vehicles, in which the bumper includes a bearer member constructed V-shaped, as viewed in cross section, whose leg ends are bent off vertically or nearly vertically into flanges and are so arranged that they are disposed on the side of the bearer member opposite the vehicle; a protective bar of rubber or similar material is mounted on the bumper, possibly by the interposition of a support member.

26 Claims, 8 Drawing Figures

INVENTOR
HERMANN RENNER

BY Craig, Antonelli + Hill
ATTORNEYS

INVENTOR
HERMANN RENNER

BY Craig, Antonelli & Hill
ATTORNEYS

BUMPER FOR MOTOR VEHICLES

The present invention relates to a bumper or the like for motor vehicles, especially for passenger motor vehicles with a protective strip or bar of rubber or similar material mounted thereon.

It is generally customary to equip motor vehicles as well as also rail vehicles and vehicles not driven by engines with bumpers. Such bumpers consist in most cases of steel or also of synthetic resinous material. The aim underlying the present invention now consists to provide, by a special construction, a bumper with a large impact surface superior and improved compared to the known prior art bumpers, which is more deformation-resistant and buckling-resistant.

As a solution to the underlying problems, the bumper essentially consists, according to the present invention, of a V-shaped bearer, as seen in cross-section, whose leg ends are bent off perpendicularly or nearly perpendicularly into flanges and are arranged in such a manner that they are disposed on the side of the bearer opposite the vehicle.

According to the present invention, the cross-axis of the bearer may assume a horizontal position or also a slightly forwardly downwardly inclined position toward the open side for purposes of the decorative appearance.

In a preferred embodiment of the present invention, the legs of the bearer may be provided with several embossments which are constructed nose-like and which serve for the reinforcement of the vertical or nearly vertical flanges provided as connecting surfaces of other impact absorbing parts.

In order to further reinforce the V-shaped bearer, the present invention additionally provides to arrange several webs between the legs of the bearer or at the support member.

As a further feature of the present invention, the bearer may be securely connected at the side of the flanges with at least one support member or a decorative bar or strip whereby the support member consists of a metallic, synthetic resinous or rubber-like material.

The bumpers proposed in accordance with the present invention may also be so constructed that the bearer is provided at the side of the flanges with support members of which one consists of metal or synthetic resinous material and the other of rubber or similar material.

The construction of the support member secured in front of the bumper is particularly advantageous if a synthetic resinous materials, for example, glass-fiber-reinforced polyester resins, are used as materials therefor, since they are suitable as material for such types of structural parts not only as regards the shaping and design latitude but also with respect to the favorable mounting of the elastic protective strips or bars.

For the rapid and secure fastening of the protective strip or bar, several hooks, buttons or clamps may be provided externally at the flange sides of the bearer or at the supporting member.

In an advantageous construction of the present invention, the bearer and the support member may be securely enclosed in part by the protective bar or strip so that any securing elements can be dispensed with.

It is further possible according to the present invention to vulcanize or bond the protective strip or bar to the support member.

In order to improve the stability of such bumpers, the leg ends of the bearer can be bent from the flange side in the direction toward the vehicle.

In lieu of this construction the support member according to the present invention may be provided with legs bent in the direction toward the vehicle.

Accordingly, it is an object of the present invention to provide a bumper for motor vehicles, especially passenger motor vehicles, which avoids by simple means the aforementioned shortcomings and drawbacks.

Another object of the present invention resides in an improved bumper which offers a large impact surface, yet is relatively deformation-resistant and resistant to denting, buckling, etc.

A further object of the present invention resides in a bumper for motor vehicles which exhibits a relatively large rigidity, yet is simple in construction and offers a great latitude in design.

These and further objects, features and advantages of the present invention will become more apparent from the following description when taken in connection with the accompanying drawing which shows, for purposes of illustration only several embodiments in accordance with the present invention, and wherein.

Figure 1:
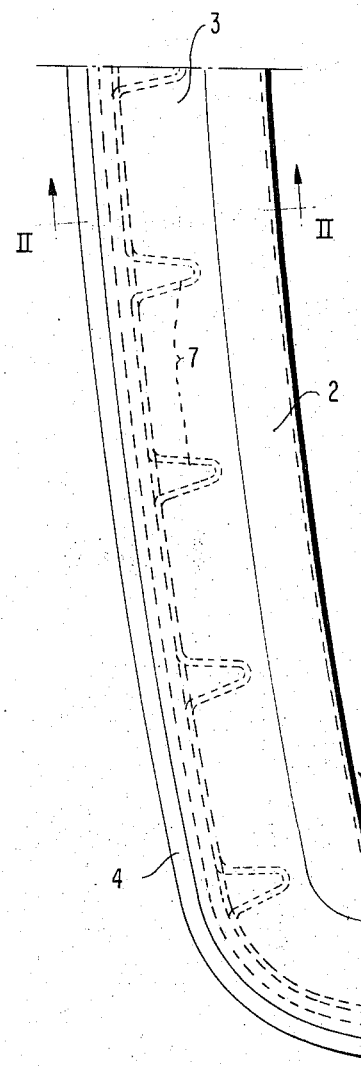
FIG. 1 is a partial plan view of a bumper in accordance with the present invention.
Figure 2:
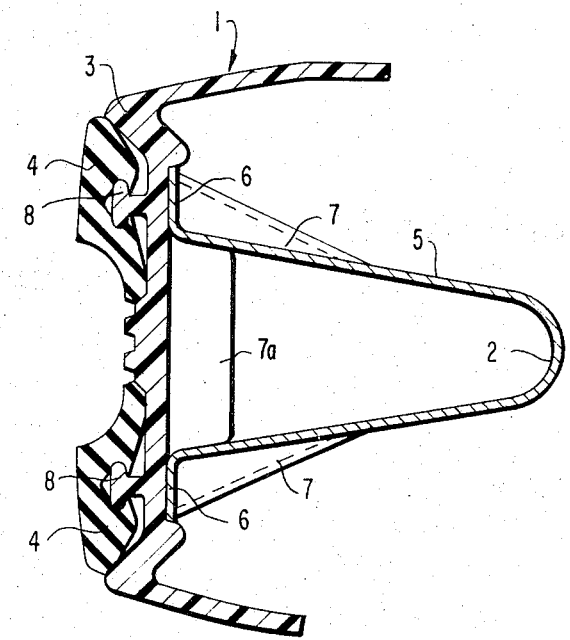
FIG. 2 is a cross-sectional view, on an enlarged scale, of the bumper of FIG. 1, taken along line II—II.

Referring now to the drawing wherein like reference numerals are used throughout the various views to designate like parts, and more particularly to FIG. 1, a bumper generally designated by reference numeral 1 and shown in this figure up to half its length, essentially consists of a V-shaped bearer 2, shown more clearly in FIG. 2 of a support member 3 rigidly connected with the bearer 2 and/or of a protective strip or bar 4 consisting of rubber or similar material. The legs 5 of the bearer 2 are bent off perpendicularly at the ends into flanges 6 which are intended to be substantially vertical in the assembled condition of the bumper when secured to the vehicle. The flanges 6 also serve as connecting or fastening surfaces for a unitary or multipartite support member 3 or for at least one protective strip or bar 4, as FIGS. 2 to 6. Additionally the bearer 2 is provided with a number of embossments 7 differing in size thereof, which are arranged respectively on an outwardly facing side of each leg 5 and, depending on the number of embossments, effect a desired and advantageous reinforcement of the bearer 2 together with its flanges 6 over the entire length thereof.

Additionally, for the further reinforcement of the bearer, webs 7a (FIG. 2) are arranged between the legs 5 or at the support member 3 for the same purpose.

The flanges 6 of the bearer 2 (FIG. 4) or the support members 3 (FIGS. 7 and 8) are provided with several suitable fastening elements 8 consisting of buttons, hooks, or clamps for the attachment of at least one protective strip or bar 4.

Possibly also a T-shaped or V-shaped rail may be arranged at the flanges 6 or at the support members 3, over which the protective strip or bar 4 is mounted or slipped over.

Figure 3:
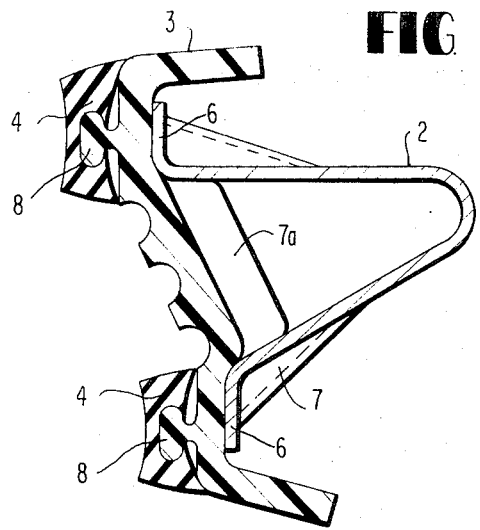
FIGS. 3 to 6 are cross-sectional views, similar to FIG. 2, of four modified embodiments of a bumper in accordance with the present invention.

In the embodiments of the bumper 1 illustrated in FIGS. 2 and 3 bearer 2, provided with webs 7a, consists of a metallic material, while the support member 3, securely connected with the bearer 2, consists of synthetic resinous material of any known, suitable type. The two protective strips or bars 4 may be secured to the support member 3 by clip-on type fastening elements 8 of rubber or the like. According to FIG. 2 the cross-axis of the bumper is arranged horizontally and according to FIG. 3 the cross-axis of the bumper is arranged slightly inclined forwardly toward the open side of the V-shaped bearer whereby the flanges 6 of the bearer continue to assume a substantially vertical position in the installed position of the bumper.

Figure 4:
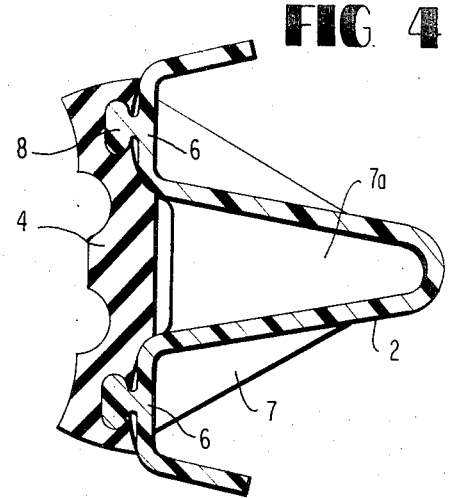

In the bumper illustrated in FIG. 4 the bearer 2, consisting of a suitable synthetic resinous material, for example, a glass-fiber-reinforced polyester resin, is provided with webs 7a disposed between the legs and replacing the support member 3. The bearer 2 of this embodiment is directly connected with the unitary protective strip or bar 4 by any suitable known means, for example, again by clip-on fastening elements 8.

Figure 5:
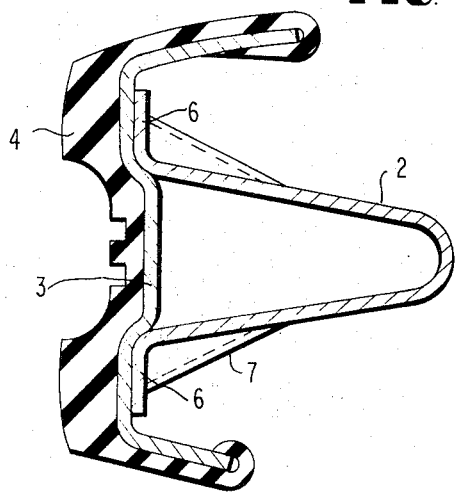
Figure 6:
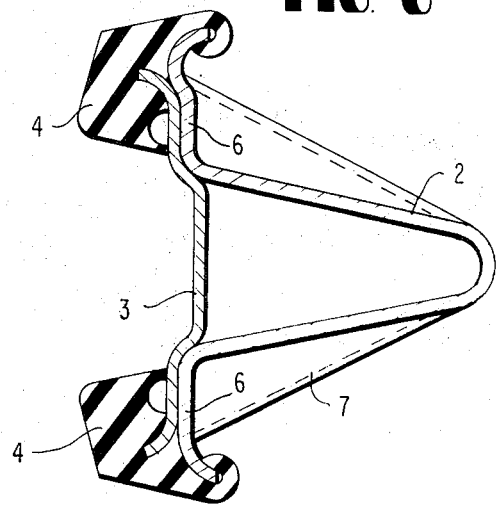

The bumpers illustrated in FIGS. 5 and 6 are provided with a metallic bearer 2, a metallic support member 3 and with a protective strip or bar 4 consisting of rubber and extending uninterruptedly in the direction of the bumper height (FIG. 5) or arranged spatially in the direction of the bumper height (FIG. 6) into two strip portions. In FIG. 6 the bearer 2 and the support member 3 are non-slidingly and clampingly retained at their upper and lower ends by the partially slipped over rubber of the protective bar 4 so that clamps, bolts or the like are not necessary. In FIG. 5 the protective bar 4 is clampingly slipped over only the bent-back end portions of the support member 3 or may also be vulcanized over the same or bonded thereto. According to FIG. 6 the support member 3 may possibly be rigidly connected with the bearer 2 by conventional means, such as spot-welding or the like.

Figure 7:
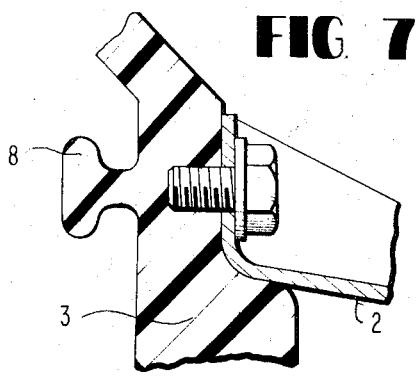
FIGS. 7 and 8 are partial cross-sectional views, on an enlarged scale, illustrating two fastening possibilities of a bearer with a support member consisting of synthetic resinous material.
Figure 8:
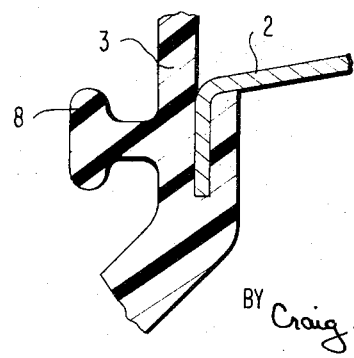

All of the bearers 2 and support members 3 of the bumpers are connected with each other by means of bolts, rivets, bonding, spot-welding, molding or casting-in or the like. Typical examples thereof are illustrated in FIGS. 7 and 8.

The leg ends of the bearer 2 according to FIGS. 4 and 6 are bent back from the flange side toward the vehicle whereas according to FIGS. 2 and 3 and 5 the support members 3 are provided with legs bent back in the direction toward the vehicle.

The support of the bumper at the vehicle or chassis, not shown in the drawing, may be realized in a conventional manner by way of rigid or elastic connecting members and/or by way of energy-dissipating deformation members.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A bumper for motor vehicles comprising: at least one protective bar means of rubber-like material and a V-shaped bearer means extending substantially along the entire length of said bar means for bearing same, each leg of the V-shaped bearer means being provided with several triangular shaped embossments and a flange which is substantially perpendicular to each leg.

2. A bumper according to claim 1, characterized in that the bearer means has a cross axis with a substantially horizontal position.

3. A bumper according to claim 1, characterized in that the bearer means has a cross axis which is slightly forwardly inclined toward the open side of the bearer means.

4. A bumper according to claim 1, characterized in that web means are provided between the legs of the bearer means.

5. A bumper according to claim 1, characterized in that a support means includes several web means provided for the bearer means.

6. A bumper according to claim 1, further comprising support means securely connected with the bearer means.

7. A bumper according to claim 6, characterized in that the support means consists of a metallic, material.

8. A bumper according to claim 5, characterized by fastening means arranged outwardly at the support means.

9. A bumper according to claim 6, characterized in that said fastening means are selected from the group consisting of hooks, buttons and clamps.

10. A bumper according to claim 6 wherein said support means consists of a synthetic resinous material.

11. A bumper according to claim 6, wherein said support means consists of a rubber-like material.

12. A bumper according to claim 1, characterized by several fastening means arranged outwardly at the flange sides.

13. A bumper according to claim 12, characterized in that said fastening means are selected from the group consisting of hooks, buttons and clamps.

14. A bumper according to claim 1, characterized in that the bumper includes support means, the bearer and support means being partially securely surrounded by the protective bar means.

15. A bumper according to claim 1, characterized in that a support means is secured to the bearer means, and in that the protective bar means is secured to the support means.

16. A bumper according to claim 15, characterized in that the protective bar means is vulcanized onto the support means.

17. A bumper according to claim 15, characterized in that the protective bar means is bonded to the support means.

18. A bumper according to claim 15, characterized in that the leg ends of the bearer means are bent from the flange side toward the vehicle.

19. A bumper according to claim 15, characterized in that the support means includes leg portions bent in the direction toward the vehicle.

20. A bumper according to claim 15, wherein said support means consists of metallic material.

21. A bumper according to claim 15, characterized by fastening means arranged outwardly at the support means.

22. A bumper according to claim 1, characterized in that web means are provided between the legs of the bearer means.

23. A bumper according to claim 1, characterized in that a support means is secured to said bearer means, said support means including several web means provided for the bearer means.

24. A bumper according to claim 1, characterized in that the bearer means is directly connected at the flange side to the protective bar means.

25. A bumper for motor vehicles comprising: at least one protective bar means of rubber-like material and a V-shaped bearer means extending substantially along the entire length of said bar means for bearing same, each leg of the V-shaped bearer means terminating in a flange which is substantially perpendicular to each leg a support means consisting of a synthetic resinous material secured to the bearer means said protective bar means being secured to the support means.

26. A bumper for motor vehicles comprising: at least one protective bar means of rubber-like material and a V-shaped bearer means extending substantially along the entire length of said bar means for bearing same, each leg of the V-shaped bearer means terminating in a flange which is substantially perpendicular to each leg a support means consisting of a rubber-like material secured to the bearer means, said protective bar means being secured to the support means.

* * * * *